United States Patent Office 2,927,130
Patented Mar. 1, 1960

2,927,130

RECOVERY OF ALKALIES AND TEREPHTHALIC ACID FROM AQUEOUS SOLUTIONS CONTAINING ALKALI SALTS OF TEREPHTHALIC ACID

Hartwig Schütt, Hagen, Westphalia, Germany, assignor to Henkel & Cie. G.m.b.H., Dusseldorf-Holthausen, Germany, a corporation of Germany No Drawing. Application June 11, 1956
Serial No. 590,382

Claims priority, application Germany June 13, 1955

7 Claims. (Cl. 260—525)

This invention relates to a novel method of separating terephthalic acid from aqueous solutions comprising substantial quantities of alkali salts of terephthalic acid, and more particularly to a method of recovering terephthalic acid from such solutions with the aid of carbon dioxide.

In the production of alkali salts of terephthalic acid involving the heating of alkali salts of orthophthalic, isophthalic or benzoic acid in an inert atmosphere, preferably in an atmosphere of carbon dioxide, a solid reaction product is obtained which contains substantial quantities of alkali terephthalates. Terephthalic acid is recovered from this reaction product by dissolving the product in water, acidifying the aqueous solution with an acid which is stronger than terephthalic acid, especially with hydrochloric acid or sulfuric acid, whereby the alkali terephthalates are transformed into free terephthalic acid which precipitates from the acidified solution in very pure form, and separating the precipitate from the solution. Such processes are described in co-pending applications Serial No. 392,512, filed November 16, 1953, now abandoned, and Serial No. 395,609, filed December 1, 1953, now abandoned. In a similar fashion, terephthalic acid may also be recovered from reaction mixtures containing substantial amounts of alkali terephthalates obtained from other sources; for example, the above procedure is also employed to separate terephthalic acid from the reaction mass obtained in the alkaline hydrolysis of synthetic fiber waste material containing terephthalic acid derivatives, or from the wash solutions obtained by washing terephthalic acid out of the oxidation products of suitable organic compounds, such as benzene derivatives alkyl-substituted in the paraposition, with alkalies.

However, this method of recovering terephthalic acid has the serious disadvantage that the alkali atom or atom group combines with the anion of the stronger acid to form the corresponding soluble salt, which must then be transformed by devious methods into the corresponding hydroxides or carbonates if a recovery of the alkali is contemplated.

It is an object of the present invention to provide a method of separating terephthalic acid from aqueous solutions comprising substantial quantities of alkali terephthalates, which will not only produce good yields of pure terephthalic acid but will also combine the alkali radical in a form suitable for direct re-use in a process for the production of more terephthalic acid, involving the rearrangement of benzene carboxylates at elevated temperatures.

Other objects and advantages of the present invention will become apparent as the description thereof proceeds.

I have found that dialkali salts of terephthalic acid in aqeous solution can easily be divided into difficultly soluble monoalkali salts and alkali bicarbonate by introducing carbon dioxide into the solution, and that the difficultly soluble monoalkali salts of terephthalic acid can be hydrolyzed with water into free terephthalic acid and dialkali salts of terephthalic acid. The free terephthalic acid separates out as a solid, while the dialkali terephthalate remains in solution.

Of particular interest as alkalies are sodium, potassium and ammonium. For purposes of illustration, the invention will be described only in conjunction with the potassium salts, but the principles can be analogously applied to other alkali terephthalate compounds.

The following reactions form the basis of the process in accordance with the invention:

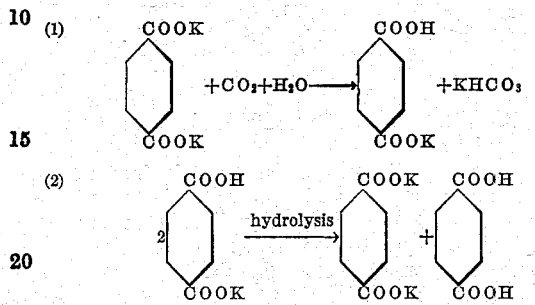

If the aqueous solutions used as the starting materials are not entirely clear, they are advantageously freed from insoluble and other undesirable substances by filtration or any other purification process; for example, by treatment with activated charcoal. The concentration of dipotassium terephthalate may vary within wide limits. The minimum concentration of dipotassium salt theoretically required is the equivalent amount of monopotassium terephthalate which can be dissolved under the reaction conditions in the amount of water used. A saturated aqueous solution of monopotassium terephthalate at about 20° C. contains from 0.05–0.06% by weight of this salt. However, in general the process is carried out at considerably higher concentrations; for example, at concentrations from 1–10% by weight of the dipotassium salt based on the weight of the entire solution. It is also possible to work with a fully saturated dipotassium terephthalate solution; the saturation concentration depends substantially upon the working temperature. At 20° C. the saturation concentration is, for example, about 15% by weight. The solution may even contain suspended undissolved dipotassium terephthalate, because it dissolves in the course of the reaction and reacts to form potassium bicarbonate and monopotassium terephthalate.

Since the presence of dissolved carbon dioxide in the solution is a prerequisite for the performance of the process, it is advantageous to work at moderately elevated temperatures; for example, below 50° C. and preferably below 30° C. The working temperature may, however, be considerably lower and may even be as low as the freezing point of the solution. It is, however, preferred to work at temperatures above 0° C. The introduction of carbon dioxide into the aqueous solution may be accomplished in any desired manner. It is possible to work at atmospheric pressures or the carbon dioxide may be introduced at a pressure which may be as high as the vapor pressure of pure carbon dioxide at the prevailing temperature. Shortly after the carbon dioxide is introduced, the monopotassium terephthalate begins to precipitate. This precipitation may, if desired, be carried out fractionally, for example for the purpose of purification. The introduction of the carbon dioxide may be controlled and terminated according to the desired proportion of potassium terephthalate precipitated from the solution. If the process is carried out under conditions at which carbon dioxide does not escape into the atmosphere unused, for example when pressure vessels are used, the theoretical amount of carbon dioxide is sufficient to bring about a virtually quantitative transformation of the dipotassium terephthalate into monopotassium terephthalate and potassium bicarbonate. A small excess which is sufficient to maintain the pressure is usually employed.

After the monopotassium terephthalate has been precipitated and filtered off, the filtrate contains small amounts of dipotassium terephthalate in addition to potassium bicarbonate. If it is also desired to separate these dissolved quantities of dipotassium terephthalate, the solution is concentrated by evaporation and the dissolved salt is again precipitated with carbon dioxide from the concentrated solution.

When treating sodium terephthalate solutions in an analogous fashion, the first precipitation fractions are obtained free from bicarbonate. If, on the basis of the existing concentration conditions, the precipitation of sodium bicarbonate can be expected, it is advantageous to operate at somewhat higher temperatures, for example at 30–50° C., so that the sodium bicarbonate remains in solution.

The potassium bicarbonate solution thus obtained contains approximate one-half of the potassium in the original solution. In that form it may directly be used, for example in the preparation of potassium benzoate or phthalate, by dissolving orthophthalic acid or benzoic acid therein and evaporating the solution to dryness. The dry salts may then be employed as starting materials for the production of terephthalic acid by rearrangement at elevated temperatures, as above set forth. It is, however, also possible to drive off carbon dioxide by heating the solution and thereby to transform the potassium bicarbonate into potassium carbonate, which may then be transformed into potassium hydroxide by reaction with calcium hydroxide. As in the case of the potassium bicarbonate solution, the potassium carbonate or potassium hydroxide solution can also be used for dissolving orthophthalic acid or benzoic acid or for other suitable purposes.

In order to recover the second half of the potassium contained in the precipitated monopotassium terephthalate, the precipitate is suspended in water and hydrolyzed to form terephthalic acid and potassium terephthalate. Because of its low solubility, the terephthalic acid precipitates out. In this step the reaction conditions depend largely upon the concentration of the solution in which the hydrolysis of the monopotassium terephthalate is carried out. The term "concentration" relates to the entire amount of suspended monopotassium terephthalate in contact with the water, without taking into consideration the small amounts of dissolved monopotassium terephthalate which may possibly be present. The minimum amount of monopotassium terephthalate to be used with any given amount of water must be such that the amount of terephthalic acid formed in accordance with reaction (2) above is larger than the quantity which can be dissolved by the water present in the system. Since the solubility of terephthalic acid in water is very small (0.0015% at 20° C.; 1.8% at 200° C.), this separation step is carried out at considerably higher concentrations. However, in this reaction phase, it is advantageous to work in a moderately concentrated solution, because the hydrolysis of monopotassium terephthalate is enhanced under these conditions; it proceeds more rapidly in more dilute solutions and at lower temperatures (about 50° C.) than in more highly concentrated solutions. On the other hand, if this phase is carried out in more dilute solutions and at more elevated temperatures, a relatively large part of the treated monopotassium terephthalate remains in solution in the form of dipotassium terephthalate. It is therefore advantageous to operate at concentrations from 1–5% by weight of monopotassium terephthalate and at the boiling point of the solution. In general, atmospheric pressure is used; only at higher concentrations, for example in the range of 5–10% by weight, is it advantageous to use elevated pressures, which may range up to the critical pressure of water under the prevailing conditions.

If, in place of potassium salts, the corresponding ammonium or sodium salts are treated, the working conditions may be correspondingly varied to take into account the different solubilities of the ammonium or sodium compounds; that is, the amount of precipitating monoterephthalate decreases in the order—potassium, ammonium and sodium. If, however, it is still desired to work up the entire amount of dialkali terephthalate, the saturated mother liquid must be evaporated more frequently.

Terephthalic acid salts which have been produced by heating the corresponding salts of orthophthalic acid or benzoic acid in the presence of carbon dioxide may also contain untransformed starting salts and side products, such as the salts of benzene tricarboxylic acids. A few of the benzene tricarboxylic acids, as well as the benzoic acid, also form difficulty soluble acid salts which may precipitate after the complete precipitation of the monoterephthalate, and possibly even after the evaporation of the solution. Orthophthalic acid remains in solution in the form of the dipotassium salt. The mother liquors obtained in the various reaction phases—for example, by evaporating the alkali bicarbonate solution and the carbon dioxide formed by dissolving orthophthalic acid or benzoic acid in alkali carbonate or alkali bicarbonate salts—are advantageously recycled into the process.

The dissociation of dialkali terephthalates by the carbon dioxide into monoalkali terephthalates and potassium bicarbonate was not predictable, because terephthalic acid is a much stronger organic acid ($K_1 = 2.8 \cdot 10^{-4}$; $K_2 = 4.0 \cdot 10^{-5}$) than the relatively weak carbon dioxide ($K_1 = 4.3 \cdot 10^{-7}$). However, also the second process step—namely, the hydrolysis of the acid alkali terephthalate into terephthalic acid and dialkali terephthalate—was not predictable. It can be regarded as a special advantage of the process according to the invention that the recovery of the free terephthalic acid from the reaction product, its purification and the recovery of the alkali can be carried out in a single continuous procedure, and that all of the reagents, such as the alkali and the carbon dioxide, can be recycled into the process.

In carrying out the process on an industrial scale, it is sometimes necessary to make an analytical determination of the amount of mono- or dialkali terephthalates, or mixtures thereof, in the solutions. The monoalkali terephthalate present in an aqueous solution can be titrated with alkali hydroxide in the same way as a monobasic weak acid in the presence of phenolphthalein. In order to determine the presence of dialkali terephthalate in addition to monoalkali terephthalate in aqueous solution, the total amount of terephthalic acid is precipitated at the boiling point of the solution with a measured excess of a standard solution of a strong acid, such as sulfuric acid, then boiled for two minutes, and filtered at room temperature through a glass frit vacuum filter; the filter residue is washed with water and the excess acid in the filtrate is back-titrated with alkali hydroxide in the presence of methyl orange. The portion of acid equivalent to the dialkali terephthalate is then equal to the difference between the amount of acid used up for the neutralization of the total amount of terephthalic acid and the amount of alkali hydroxide used to neutralize the monoalkali terephthalate.

The following examples will further illustrate the present invention and enable others skilled in the art to understand my invention more completely. However, these examples are given only for the purpose of illustration and explanation, and I do not wish to be limited to the exact materials and conditions recited therein.

Example I

From a cold saturated aqueous solution of dipotassium terephthalate which contained 21.0 gm. terephthalic acid in the form of its neutral potassium salt in 150 cc. of total solution, the monopotassium salt of terephthalic acid was fractionally precipitated by introducing gaseous carbon dioxide into the solution. Each precipitate was filtered off with a high vacuum suction, and the filter cake in each case was washed with a small amount of water. The following fractions were obtained:

1st fraction=8.5 gm.; acid No.=262/264; 19.44% K 0.1% $CO_2$
2nd fraction=5.0 gm.; acid No.=262.5/265; 19.38% K 0.7% $CO_2$
3rd fraction=4.2 gm.; acid No.=224.5/221.5; 22.30% K 0.4% $CO_2$
4th fraction=5.6 gm.; acid No.=271/268; 19.48% K 0.7% $CO_2$ Since further introduction of carbon dioxide into the filtrate did not precipitate any more monopotassium terephthalate, the solution was concentrated by evaporation from 150 cc. to about 55 cc. Upon introducing further carbon dioxide into the concentrated solution, a fifth fraction was precipitated weighing 2.0 gm.; acid No.=243/247. After evaporating the filtrate of this precipitation fraction by boiling until the volume was reduced to 18 cc. and then introducing additional carbon dioxide, a sixth fraction weighing 0.5 gm., acid No.=255/255, was precipitated. The 18.0 cc. of mother liquor were found to contain 0.34 gm. terephthalic acid, 5.9 gm. potassium and 7.0 gm. carbonate.

Example II 5.0 kg. of technically pure (98.3%) terephthalic acid and 6.8 kg. extra pure potassium hydroxide in the form of a 50% aqueous solution were dissolved in 26.6 kg. water. This solution was filtered but only very small, virtually unweighable amounts of a slimy substance were separated out. By passing carbon dioxide into the clear solution, monopotassium terephthalate was fractionally precipitated out. Each precipitate was filtered with a strong vacuum suction and the filter cake was washed with a small amount of water. The following fractions were obtained:

1st fraction: 2.035 kg.; acid No.=275/277
2nd fraction: 1.135 kg.; acid No.=274/274
3rd fraction: 1.245 kg.; acid No.=269/272

By evaporating the mother liquor to 10 liters, introducing carbon dioxide into the evaporated solution, filtering off the precipitate, evaporating the filtrate to 6 liters, again introducing carbon dioxide and filtering off the precipitate formed thereby, the following two additional fractions were obtained:

4th fraction: 1.020 kg.; acid No.=270/274
5th fraction: 0.555 kg.; acid No.=269.5/272

The filtrate of the fifth fraction still contained 57 gm. of terephthalic acid and 2.36 kg. potassium.

Example III 10.0 gm. of acid potassium terephthalate (acid No. 277, containing 8.12 gm. terephthalic acid=99.7% of theory), were suspended in 500 cc. of distilled water and the mixture was boiled for three hours. It was then allowed to cool and 3.73 gm. terephthalic acid (acid No. 680/682, theoretical 4.06 gm.) were filtered off. The filtrate was analyzed and found to contain 0.26 gm. terephthalic acid in the form of acid potassium terephthalate and 4.05 gm. terephthalic acid in the form of dipotassium terephthalate.

Example IV

The starting material was the reaction mixture obtained by subjecting dipotassium orthophthalate to a thermal rearrangement reaction at temperatures above 340° C. in an inert atmosphere. The reaction product was dissolved in water, and the solution was freed by filtration from undissolved components, such as carbon-containing dissociation products. The filtered solution contained the following principal components:

10.6 percent K
3.5 percent $CO_2$
9.9 percent terephthalic acid
0.5 percent benzoic acid
0.35 percent trimesitinic acid Dark impurities in this solution were partially removed together with the first precipitation fraction. The rest remained in the mother liquor.

75.0 kg. of this solution, which contained 7.45 kg. terephthalic acid, corresponding to 9.15 kg. acid potassium terephthalate or 10.86 kg. dipotassium terephthalate, 7.96 kg. potassium and 2.65 kg. carbon dioxide, were intimately admixed with carbon dioxide in a pressure vessel for about eight hours at room temperature accompanied by stirring; the pressure was maintained at about 2 kg. per square centimeter. 6.34 kg. of monopotassium terephthalate were precipitated thereby. After filtering this solution and evaporating the filtrate to about one-third of its original volume, it was again treated with carbon dioxide whereby 1.96 kg. of monopotassium terephthalate precipitated; the precipitate was filtered off. After concentrating the filtrate by evaporation and repeating the carbon dioxide treatment, 0.508 kg. of monopotassium terephthalate precipitated out. The separated fractions of monopotassium terephthalate were repeatedly washed with small amounts of water and the various wash water fractions were combined with the mother liquors. The total amount of 8.808 kg. monopotassium terephthalate represented 96.4% of the total of 9.15 kg. of acid potassium terephthalate which could be theoretically precipitated according to the analytical data. A determination of the terephthalic acid content of the mother liquor revealed that it contained 246 gm. terephthalic acid=3.4% of the terephthalic acid in the starting material.

After crystallizing the acid potassium terephthalate from the solution, two separate solutions were obtained: one weighing 33.6 kg. with 15.44% K, and the other weighing 7.1 kg. with 15.15% K. This corresponds to a total amount of potassium of 6.27 kg. If the 1.68 kg. of potassium precipitated in the form of the acid salt are added thereto, a total amount of 7.95 kg. potassium is obtained, which corresponds to the previously analytically determined amount of 7.96 kg. potassium. This solution was then used for again dissolving orthophthalic acid anhydride therein, and thereby forming a new batch of starting material for thermal rearrangement into dipotassium terephthalate, as above set forth.

Example V 20.0 kg. of monopotassium terephthalate (acid No. 278/280), which were obtained by carbon dioxide precipitation analogous to Example IV, were suspended in 700 liters of water and the mixture was boiled for three hours. After cooling, the solution was filtered on a vacuum filter and 7.56 kg. of terephthalic acid were obtained. The filtrate contained 407 gm. acid potassium terephthalate dissolved therein and 8.36 kg. dipotassium terephthalate. The pH of the solution changed during the reaction from 5.0 to 7.0. The mother liquor was subsequently used to dissolve raw dipotassium orthophthalate.

Example VI

Carbon dioxide was introduced into a cold saturated aqueous solution containing 31.6 gm. disodium terephthalate in 250 cc. of solution. 3.0 gm. monosodium terephthalate (acid No. 299/302) were precipitated. Thereafter, the solution was evaporated until disodium terephthalate began to precipitate out and then carbon dioxide was again introduced. 2.8 gm. of monosodium terephthalate (acid No. 298/299) were precipitated. By proceeding in this manner and repeatedly evaporating and precipitating monosodium terephthalate, 24.6 gm. of acid sodium terephthalate were obtained, which corresponds to 87.5% of theory.

*Example VII*

25 gm. of pure terephthalic acid were suspended in 400 gm. water and dissolved with 21 gm. of aqueous ammonia solution (density=0.910) until the solution became clear. By alternately precipitating monoammonium terephthalate with the aid of carbon dioxide introduced into the solution and thereafter evaporating the filtered solution until the precipitation of the diammonium salt began, about 87% of terephthalic acid were isolated from the solution in the form of its monoammonium salt. The individual precipitates had acid numbers ranging between 340 and 390. In this case, therefore, the precipitated acid salt also contained small amounts of free terephthalic acid.

While I have given examples of specific embodiments of my invention, I wish it to be understood that the present invention is not limited to these embodiments and that various changes and modifications may be made without departing from the spirit of the invention or the scope of the appended claims.

I claim:

1. The process of separating terephthalic acid from an aqueous solution containing from about 1% to about 15% by weight of a dialkali salt of terephthalic acid, which comprises introducing gaseous carbon dioxide into the aqueous solution at temperatures from about 0° C. to about 50° C. until a substantial quantity of the corresponding monoalkali salt of terephthalic acid is formed and precipitated from the solution, separating the monoalkali salt from the solution, forming an aqueous solution containing from about 1 to about 10% of the monoalkali salt, hydrolyzing the monoalkali salt in water at elevated temperatures until substantially all of the monoalkali salt is converted into the corresponding dialkali salt of terephthalic acid and terephthalic acid, and separating the terephthalic acid from the reaction mixture.

2. The process of separating terephthalic acid from an aqueous solution containing from about 1% to about 15% by weight of a di-salt of terephthalic acid selected from the group consisting of disodium, dipotassium and diammonium salts, which comprises introducing carbon dioxide into the aqueous solution at temperatures from about 0° C. to about 50° C. until a substantial quantity of the corresponding mono-salt of terephthalic acid is formed and precipitated from the solution, separating the mono-salt from the solution, forming an aqueous solution containing from about 1% to about 10% of the mono-salts, hydrolyzing the mono-salt until substantially all of the mono-salt is converted into the corresponding di-salt of terephthalic acid and terephthalic acid, and separating the terephthalic acid from the reaction mixture.

3. The process of separating terephthalic acid from an aqueous solution containing from about 1% to about 15% by weight of dipotassium terephthalate, which comprises introducing gaseous carbon dioxide into the solution at temperatures from about 0° C. to about 50° C. until a substantial quantity of monopotassium terephthalate is formed and precipitated from the solution, forming an aqueous solution containing from about 1% to about 10% of the monoalkali salt, hydrolyzing the monopotassium terephthalate in water at elevated temperatures until substantially all of the monopotassium salt is converted into dipotassium terephthalate and terephthalic acid, and separating the terephthalic acid from the reaction mixture.

4. The process of separating terephthalic acid from an aqueous solution containing from about 1% to about 15% by weight of disodium terephthalate, which comprises introducing gaseous carbon dioxide into the solution at temperatures from about 0° C. to about 50° C. until a substantial quantity of monosodium terephthalate is formed and precipitated from the solution, separating the monosodium salt from the solution, forming an aqueous solution containing from about 1% to about 10% of the monoalkali salts, hydrolyzing the monosodium salt in water at elevated temperatures until substantially all of the monosodium salt is converted into disodium terephthalate and terephthalic acid, and separating the terephthalic acid from the reaction mixture.

5. The process of separating terephthalic acid from an aqueous solution containing from about 1% to about 15% by weight of diammonium terephthalate, which comprises introducing gaseous carbon dioxide into the solution at temperatures from about 0° C. to about 50° C. until a substantial quantity of monoammonium terephthalate is formed and precipitated from the solution, separating the monoammonium salt from the solution, forming an aqueous solution containing from about 1 to about 10% of the monoalkali salt, hydrolyzing the monoammonium salt in water at elevated temperatures until substantially all of the monoammonium salt is converted into diammonium terephthalate and terephthalic acid, and separating the terephthalic acid from the reaction mixture.

6. The process of producing monoalkali salts of terephthalic acid from an aqueous solution containing from about 10% to about 15% by weight of a dialkali salt of terephthalic acid, which comprises introducing carbon dioxide into the solution at temperatures from about 0° C. to about 50° C. until a substantial quantity of the corresponding monoalkali salt of terephthalic acid is formed and precipitated from the solution, and separating the precipitated monoalkali salt from the solution.

7. The process of producing terephthalic acid and a dialkali salt of terephthalic acid, which comprises hydrolyzing a monoalkali salt of terephthalic acid in water wherein the concentration of the monoalkali salt is from about 1 to about 10% by weight at elevated temperatures, separating the insoluble terephthalic acid formed thereby from the aqueous medium, and separating the dialkali terephthalate simultaneously formed and dissolved in the aqueous medium by evaporating the aqueous medium.

References Cited in the file of this patent

UNITED STATES PATENTS

| | | |
|---|---|---|
| 1,822,016 | Daniels | Sept. 8, 1931 |
| 2,697,723 | Carlston et al. | Dec. 21, 1954 |
| 2,789,134 | Nelson et al. | Apr. 16, 1957 |